United States Patent [19]

Axelsson et al.

[11] Patent Number: 4,768,993
[45] Date of Patent: Sep. 6, 1988

[54] BALL COUPLING

[75] Inventors: Uno Axelsson; Stig Persson; Sture Ostling, all of Katrineholm, Sweden

[73] Assignee: AB SKF, Katrineholm, Sweden

[21] Appl. No.: 5,836

[22] Filed: Jan. 21, 1987

[30] Foreign Application Priority Data

Feb. 4, 1986 [SE] Sweden ............................. 8600476

[51] Int. Cl.$^4$ ............................................. F16D 3/23
[52] U.S. Cl. ................................... 464/83; 464/139; 464/152
[58] Field of Search ................. 464/83, 102, 103, 139, 464/152, 141

[56] References Cited

U.S. PATENT DOCUMENTS

| | | | |
|---|---|---|---|
| 1,498,171 | 6/1924 | Kaps | 464/141 |
| 1,705,731 | 3/1929 | Hufferd | 464/139 |
| 2,072,843 | 3/1937 | Stack | 464/139 |
| 2,545,646 | 3/1951 | Blinkman | 464/139 |
| 3,946,576 | 3/1976 | Johansson | 464/83 |
| 4,183,229 | 1/1980 | Johansson | 464/139 X |

FOREIGN PATENT DOCUMENTS

| | | | |
|---|---|---|---|
| 128531 | 8/1983 | Japan | 464/139 |
| 28210 | of 1913 | United Kingdom | 464/139 |
| 1557832 | 12/1979 | United Kingdom | 464/83 |

Primary Examiner—Daniel P. Stodola
Attorney, Agent, or Firm—Eugene E. Renz, Jr.

[57] ABSTRACT

A device for elastic interconnection of two rotatable shafts consisting of a first sleeve intended to be connected to a first shaft end. The sleeve has a radial flange and a cylindrical, annular portion connected to the periphery of the flange. A second sleeve is intended to be connected to a second shaft end and to be surrounded by said cylindrical portion. A number of elastically deformable spherical elements are arranged in opposing recesses in said second sleeve and cylindrical portion and distributed around a shaft end. The recesses in the cylindrical portion are arranged in the end surfaces of plugs and provided with external threads. The plugs by being turned are displaceable in threaded bores provided radially in the wall of the cylindrical part. The outer end surfaces of the plugs are provided with diametrical grooves and the cylindrical portion is provided with a diametrical groove. The diametrical grooves and the peripheral grooves define an annular groove. A locking ring is disposed in the annular groove to lock all the plugs in a desired position.

3 Claims, 3 Drawing Sheets

BALL COUPLING

FIELD OF THE INVENTION

The present invention relates to resilient coupling devices particularly adapted for use in torque transmitting applications characterized by novel features of construction and arrangement including a novel locking arrangement for locking all of the plug elements of the unit simultaneously.

BACKGROUND OF THE INVENTION

The device is primarily intended for use in such applications where a torque is to be transmitted between two shafts and the coupling allows the shafts to form a certain angle and/or the shafts are displaceable parallel to each other. An earlier device of this kind is shown for example in the Swedish Patent Publication No. 7405180-6.

SUMMARY OF THE INVENTION

The purpose of the present invention is to provide a device of the kind stated above in which the elastic elements can be mounted, dismounted and prestressed individually without the need for dismounting the device or removing it from the shafts or the like, and which device can easily be given different properties regarding for example stiffness and ability to accommodate misalignments.

This is achieved in accordance with the present invention by a device incorporating novel structural details and arrangement including a single locking ring which is easily assembled and disassembled and functions to lock all of the plugs in a predetermined desired position simultaneously upon application of the ring. Such a device allows exchange or adjustment of the prestress of individual elastic elements in an easy manner and by simple means. It is also easy to dismount the coupling and disengage the shafts or the like from each other during for example revision of the device or the machine in which it is a part. By using exchangeable members with different shapes, devices with different characters can be provided without exchanging all the parts of the device.

BRIEF DESCRIPTION OF THE DRAWINGS

The following is a detailed description of the invention with reference to the accompanying drawing in which.

DETAILED DESCRIPTION OF THE PREFERRED EMBODIMENT

Figure 1:
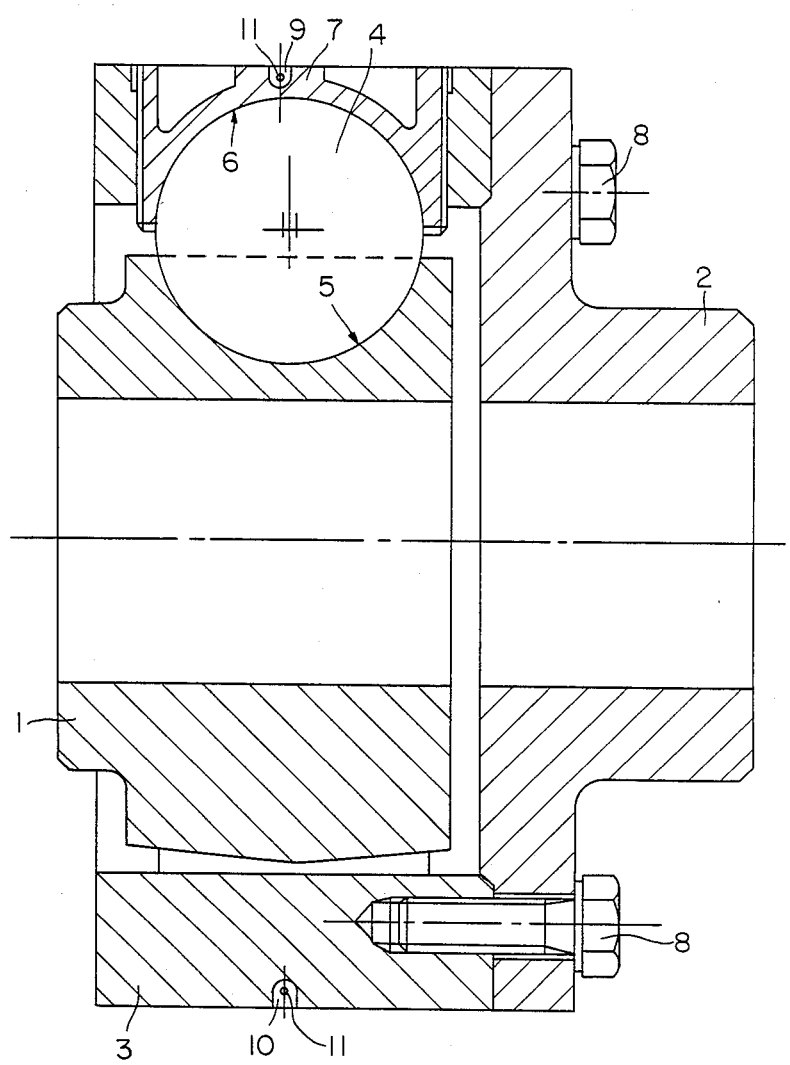
FIG. 1 shows a longitudinal section according to 1-1 in FIG. 2.
Figure 2:
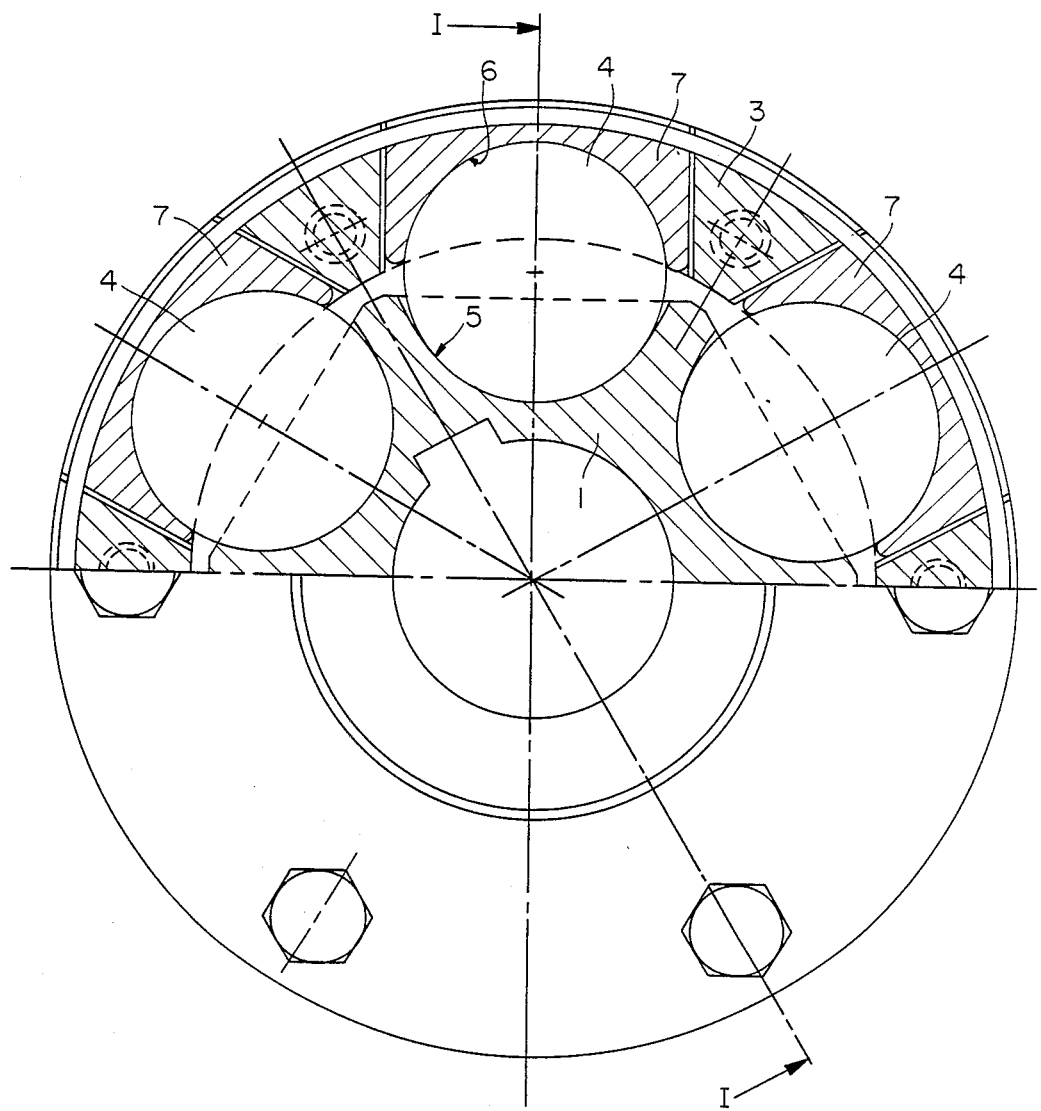
FIG. 2 shows a partial cross-section of a device according to an embodiment of the invention.

The device comprises two parts 1,2, which are intended to be mounted in any suitable manner, for example by wedges or clamping sleeves, one on each of two shafts (not shown) which are to be connected.

The part 2 is a sleeve with a radial flange and a substantially cylindrical annual portion 3 connected to the periphery of the flange and surrounding the part 1, which is another sleeve. The parts 1 and 2 are connected to each other for torque transmission via a number of elastically deformable spherical elements 4. The elements are preferably balls of massive rubber. The elements 4 are provided in opposing recesses 5,6 in the respective coupling parts and are equally distributed around one shaft end. During torque transmission between the shafts, the elements 4 are subjected to a shearing force in a diametrical plane. The outer recesses 6 are arranged in one plug 7 each. These plugs have an outer portion provided with a thread co-operating with a corresponding thread in a radial bore in the portion 3 opposing the respective recesses 5 in the part 1. The plugs 7 can thus, by being turned, be displaced radially in relation to the part 1, whereby the distances between the recesses 5 and 6 can be varied so that the pre-stress of the elements 4 arranged in the recesses is adjustable. It is also possible to screw the plugs 7 completely out of the bores in the part 3, whereby the elements 4 can be inserted in and removed from the coupling device without their parts needing to be dismounted from the shafts. If all the elements 4 are removed it is also possible to disengage the shafts from each other without dismounting the coupling parts from the shafts. Another method of making this possible is to make the part 3 as a separate ring, which by for example screws 8 is connected to the rest of the part 2. Thereby the shafts can be disconnected from each other by removing the screws 8, whereby the sleeve attached to one of the shafts is disconnected from the other parts of the coupling device, which parts are attached to the other shaft as a unit.

The plugs 7 can be locked in a desired position for example by providing their end surfaces by diametrical grooves 9, which are complements to a peripheral groove 10 in the part 3. In the annular groove thus provided there is place for a locking ring 11, which locking ring prevents turning of the plugs 7.

Because of presence of a radial play between the plugs 7 and the parts 1 and because the elements are elastically deformable it is possible to allow a certain misalignment between the parts 1 and 2, and also a certain parallel displacement of these parts. The properties of the coupling can be adjusted by pre-stressing the plugs 7 and/or choosing a proper material in the elements 4.

The properties can also be varied by using plugs with different shapes of their recesses.

Figure 3:
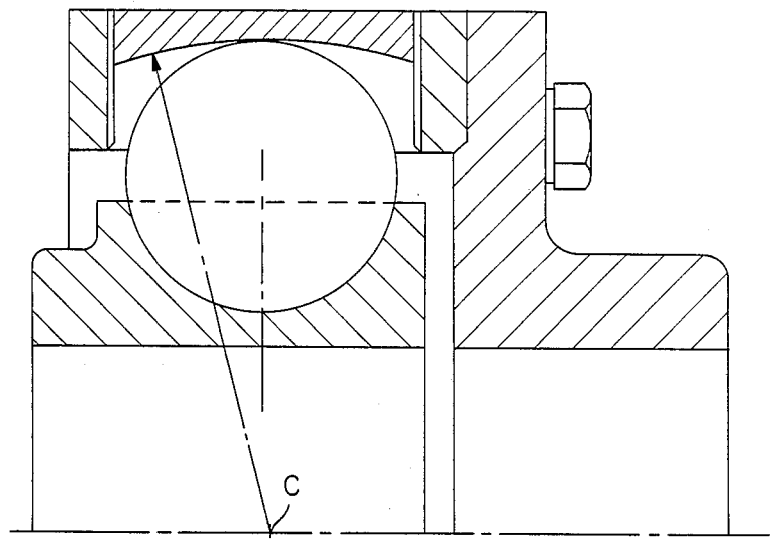
FIGS. 3 and 4 show different modified details in the invention.

An improved ability of accomodating misalignment of the interconnected shafts is obtained if the recesses in the plugs have a circular profile in planes comprising the rotational axis of the device and the centres of the respective spherical elements, as shown in the plane according to FIG. 3, the centre C of each profile circle thereby being situated on the axis of rotation radially inside the respective plug.

Figure 4:
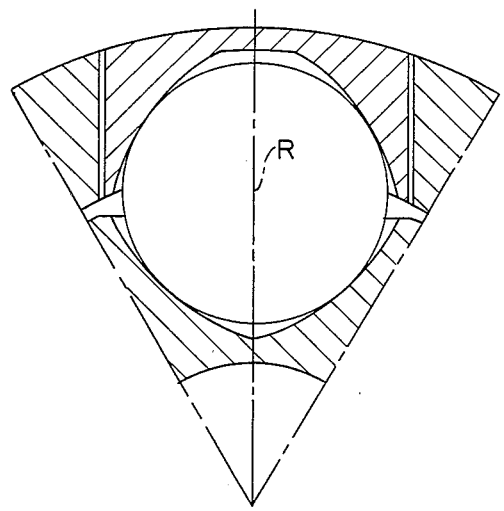

A stiffer coupling is provided by changing the form of the recesses from mainly spherical into such a shape that the recess in one plug has a wall which in a section parallel the rotational plane of the device and through the recess and the centre of the corresponding spherical element, as shown in the section according to FIG. 4, contacts the element with a maximum pressure in separated areas situated on each side of a radius R from the rotational axis of the device and through the centre of the spherical element. A recess with substantially conical shape gives such a wall. Maximum stiffness is obtained if the inner recess has the same shape as the outer recess.

Also embodiments of the invention other than the one described above are thinkable within the scope of the claims. The recesses may have a shape which is different from the ones described above. The parts 1 and 2 can be designed in another way as shown in the drawing. The plugs 7 may be provided with a plurality of diametrical grooves 9 for making it possible to lock the plugs in a number of positions.

We claim:

1. A device for elastic interconnection of two rotatable shafts, comprising a first sleeve intended to be connected to a first shaft end, which sleeve has a radial flange and a cylindrical, annular portion connected to the periphery of the flange, a second sleeve intended to be connected to a second shaft end and to be surrounded by said cylindrical portion, and a number of elastically deformable spherical elements arranged in opposing recesses in said second sleeve and cylindrical portion and distributed around a shaft end, characterized by the recesses in the cylindrical portion (3) are arranged in the end surfaces of plugs (7), provided with external threads, which plugs by being turned are displaceable in threaded bores provided radially in the wall of the cylindrical part, the outer end surfaces of the plugs being provided with diametrical grooves (9), and that the cylindrical portion (3) is provided with peripheral grooves (10), said diametral grooves (9) and the peripheral grooves (10) defining an annular groove, a locking ring (11) being disposed in the annular groove to lock all the plugs in a desired position.

2. A device according to claim 1, characterized by that the recess in one plug has a wall which in section transverse to the rotational axis of the device and through the recess and the centre of the corresponding spherical element contacts the spherical element with a maximum pressure in two separated areas situated on either sides of a radius (R) from the rotational axis through the centre of the spherical element.

3. A device according to claim 1, characterized by that the recess in one plug has a circle profile in the plane comprising the rotational axis of the device and the centre of the corresponding spherical element, the centre (C) of the profile circle being situated on the rotational shaft radially inside of the plug.

* * * * *